G. F. SIMONDS.
Assignor to the SIMONDS ROLLING MACHINE COMPANY.
DIE FOR MAKING ROLLED FORGINGS.
No. 10,928. Reissued May 8, 1888.
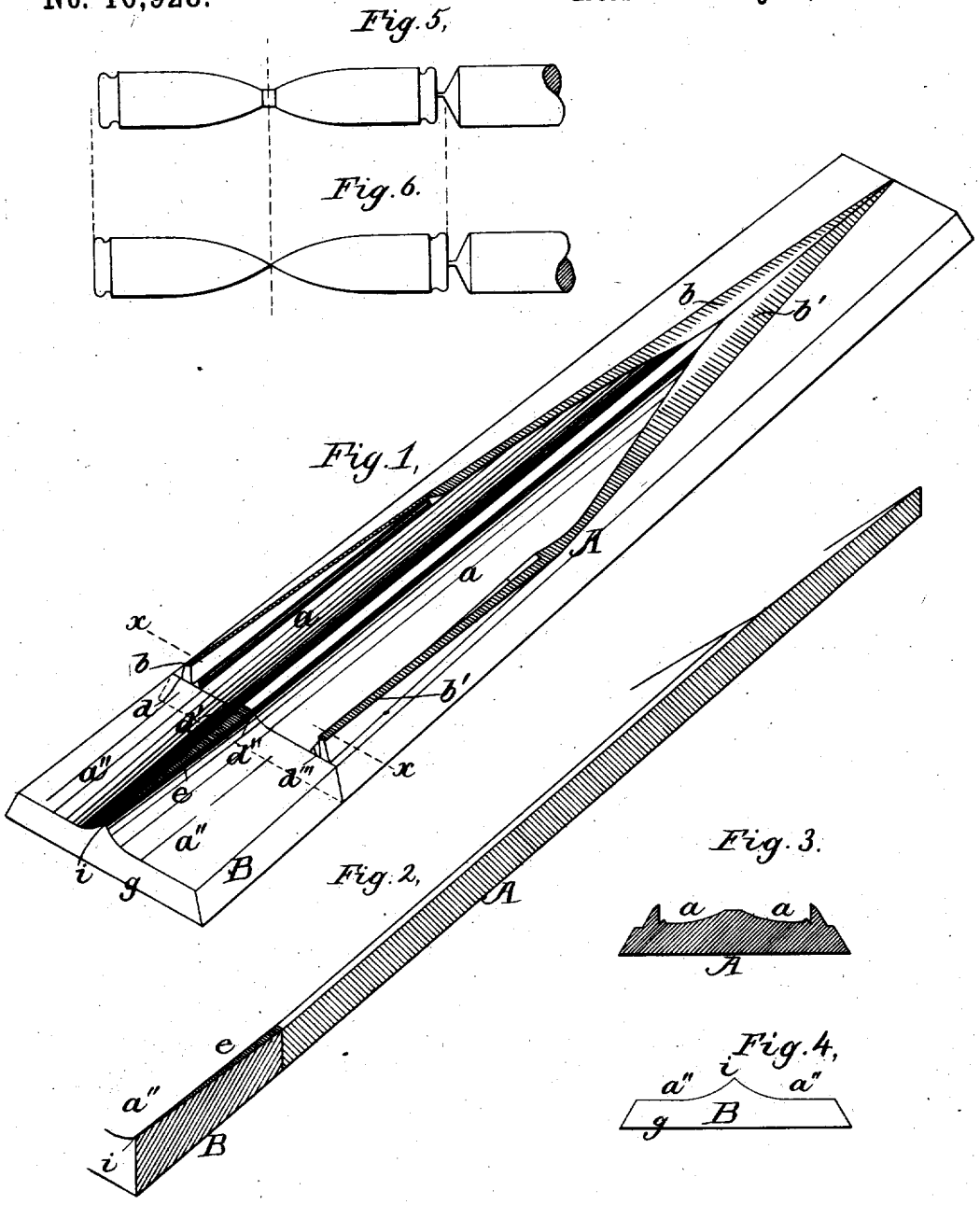
Witnesses.
Jas. J. Maloney
M. E. Hill
Inventor,
George F. Simonds,
by Jos. P. Livermore,
Att'y.
N. PETERS, Photo-Lithographer, Washington, D. C.

UNITED STATES PATENT OFFICE.

GEORGE F. SIMONDS, OF FITCHBURG, MASSACHUSETTS, ASSIGNOR TO THE SIMONDS ROLLING MACHINE COMPANY, OF SAME PLACE.

DIE FOR MAKING ROLLED FORGINGS.

SPECIFICATION forming part of Reissued Letters Patent No. 10,928, dated May 8, 1888.

Original No. 358,629, dated March 1, 1887. Application for reissue filed April 3, 1888. Serial No. 269,480½.

*To all whom it may concern:*

Be it known that I, GEORGE F. SIMONDS, of Fitchburg, in the county of Worcester and State of Massachusetts, have invented certain Improvements in Dies for Making Rolled Forgings; and I hereby declare the following to be a full, clear, and exact description of the same, reference being had to the accompanying drawings, making a part of this specification, in which—

Figure 1 is a perspective view of my improved die. Fig. 2 is a sectional perspective of the same. Fig. 3 is a cross-section on line *x x* of Fig. 1. Fig. 4 is an elevation of the finishing end of the die. Fig. 5 illustrates the work when the dies have passed to about the line *x x*. Fig. 6 illustrates the work when at the point of completion.

My invention relates to dies for use in machines for making rolled forgings, and especially adapted to be used in the machine described and shown in United States Letters Patent No. 319,752, issued to me June 9, A. D. 1885, and has for its object to produce a die which will finish two articles at one movement of the dies.

My invention is an improvement on the dies described and shown in United States Letters Patent No. 319,754, issued to me June 9, 1885; and it consists in a die having a duplex forming-surface running in line with the dies and diverging, reducing, and spreading surfaces, in combination with a supplemental finishing and dividing die-face, whereby I am enabled to produce two articles at one movement of the die, all of which will be hereinafter fully set forth, and specifically pointed out in the claim.

For purposes of illustration I have shown in the drawings my improved die designed to roll simultaneously two conical projectiles, though the die-faces may be made to conform to and produce many other articles.

In order that those skilled in the art may make and use my invention, I will proceed to describe the exact manner in which I have carried it out.

In the said drawings, A is the bed or plate of the die. Rising from the surface of said bed is a duplex forming-surface, *a a*, running in a line with the movement of the die and reducing and spreading surfaces *b b'*. These forming and spreading and reducing surfaces are made in accordance with the hereinbefore-mentioned Patent No. 319,754, and consequently need no detailed description in this specification.

The spreading and reducing surfaces proper and the forming-surface terminate at *d d' d'' d'''*, and the die has an extension-piece, B, made integral with the main die or not, as may be desired. This extension is provided with a central dividing-rib, *e*, interposed between two faces, *a'' a''*, which are substantial continuations of the terminal faces of the forming-surface *a a*. The top of the central dividing-rib, *e*, as it approaches the end *g* of the extension B is contracted to the point *i*, thereby forming a cutter or blade to gradually divide the two objects which are produced by the forming-die faces. It is desirable that the top of the rib *e* be corrugated or roughened after the manner that the spreading-surfaces are roughened, to insure a rotation of the duplex article as it is being scored for separation.

In the operation of the duplex die used in this application for illustration, when the work reaches the points *d d' d'' d'''* it has the appearance shown in Fig. 5, and when it has reached the end *g* it presents the appearance seen in Fig. 6, and the two projectiles formed can be easily separated.

Having thus described my invention, what I claim as new, and desire to secure by Letters Patent, is—

A die for making rolled forgings, having the duplex forming-surface *a a*, and spreading and reducing surfaces *b b'*, in combination with the extension-faces *a'' a''*, and interposed projected rib *e*, substantially as and for the purpose set forth.

In testimony whereof I have signed my name to this specification in the presence of two subscribing witnesses.

GEO. F. SIMONDS.

Witnesses:

JOS. P. LIVERMORE,

M. E. HILL.